United States Patent
Da Trindade Filho et al.

(10) Patent No.: US 12,276,014 B2
(45) Date of Patent: Apr. 15, 2025

(54) HIGH STRENGTH MICRO ALLOYED STEEL SEAMLESS PIPE FOR SOUR SERVICE AND HIGH TOUGHNESS APPLICATIONS

(71) Applicant: VALLOUREC TUBES FRANCE, Boulogne-Billancourt (FR)

(72) Inventors: Vicente Braz Da Trindade Filho, Boulogne-Billancourt (FR); Julio Marcio Silveira E Silva, Boulogne-Billancourt (FR); Cedric Linne, Boulogne-Billancourt (FR); Ana Carolina Caldas Vilas Boas, Boulogne-Billancourt (FR)

(73) Assignee: VALLOUREC TUBES FRANCE, Meudon (FR)

( * ) Notice: Subject to any disclaimer, the term of this patent is extended or adjusted under 35 U.S.C. 154(b) by 0 days.

(21) Appl. No.: 16/572,918

(22) Filed: Sep. 17, 2019

(65) Prior Publication Data

US 2020/0095658 A1   Mar. 26, 2020

(30) Foreign Application Priority Data

Sep. 20, 2018 (EP) ..................................... 18195795

(51) Int. Cl.
| | |
|---|---|
| *C22C 38/04* | (2006.01) |
| *C21D 8/10* | (2006.01) |
| *C22C 38/44* | (2006.01) |
| *C22C 38/48* | (2006.01) |
| *F16L 9/02* | (2006.01) |

(52) U.S. Cl.
CPC .............. *C22C 38/04* (2013.01); *C21D 8/105* (2013.01); *C22C 38/44* (2013.01); *C22C 38/48* (2013.01); *F16L 9/02* (2013.01)

(58) Field of Classification Search
CPC . C21D 8/105; F16L 9/02; C22C 38/02; C22C 38/04; C22C 38/12; C22C 38/14; C22C 38/001; C22C 38/44; C22C 38/46; C22C 38/48; C22C 38/50
See application file for complete search history.

(56) References Cited

U.S. PATENT DOCUMENTS

| 2008/0047635 | A1 | 2/2008 | Kondo et al. |
| 2008/0314481 | A1 | 12/2008 | Garcia et al. |
| 2009/0098403 | A1 | 4/2009 | Omura et al. |
| 2010/0236670 | A1 | 9/2010 | Kondo et al. |
| 2014/0137992 | A1 | 5/2014 | Ishiguro et al. |
| 2014/0299236 | A1* | 10/2014 | Anelli ...................... C21D 9/08 148/504 |
| 2015/0083282 | A1 | 3/2015 | Ueda et al. |
| 2020/0385839 | A1* | 12/2020 | Kimura .................. C22C 38/02 |

FOREIGN PATENT DOCUMENTS

| CN | 102154593 A | 8/2011 |
| EP | 1 876 254 A1 | 1/2008 |
| EP | 2 133 443 A1 | 12/2009 |
| EP | 2 728 030 A1 | 5/2014 |
| EP | 1 954 847 B1 | 7/2014 |
| EP | 2 843 072 A1 | 3/2015 |
| EP | 3 006 585 A1 | 4/2016 |
| JP | 9-20961 A | 1/1997 |

OTHER PUBLICATIONS

English translation of Jiang et al. CN102154593 from EPO Aug. 9, 2021 (9 pages) (Year: 2021).*
European Search Report issued Mar. 20, 2019 in European Application 18195795.2, filed on Sep. 20, 2018 (with opinion).

* cited by examiner

*Primary Examiner* — Adam Krupicka
(74) *Attorney, Agent, or Firm* — Oblon, McClelland, Maier & Neustadt, L.L.P.

(57) ABSTRACT

Micro alloyed steels with a yield strength of at least 485 MPa (70 ksi) with outstanding toughness behavior, good weldability and improved sulphide stress cracking resistance for line pipes, for applications as process pipes, flowlines or risers in the oil and gas industry. Tubular products, such as seamless pipes, can be made from this steel. A process for manufacturing tubular products can be performed with this steel. The seamless pipes can be used for line pipes, flowlines and risers in the oil and gas industry.

16 Claims, 6 Drawing Sheets

HIGH STRENGTH MICRO ALLOYED STEEL SEAMLESS PIPE FOR SOUR SERVICE AND HIGH TOUGHNESS APPLICATIONS

The present invention relates to micro alloyed steels with a yield strength of at least 485 MPa (70 ksi), and preferably of at least 555 MPa (80 ksi) with outstanding toughness behavior, good weldability and improved sulphide stress cracking resistance. Pipes of the invention comply with tensile requirements of grades X70 and X80 according with American Petroleum Institute standard API 5L, with sulfide stress corrosion (SSC) and hydrogen induced cracking (HIC) resistance.

The challenges to develop high-strength seamless pipes starts with the premium quality of the steel, especially regarding the narrow chemistry variation of micro alloying elements and lower carbon content in order to achieve the necessary mechanical properties and excellent weldability characteristics.

Line pipes used for transporting oil & gas have increased in strength every year in order to improve the project efficiency and at the same time decreasing investment costs. Additionally, requirement for high deformability and enhanced weldability are continuous demanded.

However, the strength and toughness trade-off, combined with the need for sulfide stress corrosion (SSC) and hydrogen induced cracking (HIC) resistance (e.g. sour resistance) is difficult to achieve. In particular, quenched and tempered (Q&T) seamless pipes of API 5L grade X70 typically exhibit maximum hardness values, measured at 1.5-2.0 mm depth from the pipe surfaces (according to API 5L-ISO 3183), below 250 HV10, whereas currently new projects require lower values to make the material weldable and resistant to SSC as per Region 3 in NACE MR-0175/ISO15156-2. This SSC resistance corresponds to high $H_2S$ combined with low pH conditions. But lower maximum hardness values cannot be consistently achieved with current steel chemical compositions and processes.

An objective of the invention is to propose robust steel grades that fulfill the above requirements. The invention proposes steel grades according to DNV 555 SP ("X80QOS") for sour service application within Class 3 domain.

The present invention also relates to tubular products, such as tubes or pipes, preferably seamless pipes, made from said steel, as well as a process for manufacturing such tubular products.

In addition, the present invention concerns use of such tubular products as seamless pipes for line pipes for applications as process pipes, flowlines or risers in the oil and gas industry. Advantageously, seamless pipes according to the invention allow reduced pipe wall thickness without any disadvantage in terms of the overall material performance under severe applications.

Harsher environment applications had encouraged a search for accessories made of steels having good and stable mechanical properties and a satisfying toughness behavior at low temperatures, especially where high imposed strains can take place at cryogenic service temperatures down to −60° C. or even down to −80° C.

The required increase in strength while maintaining adequate ductility of hot-processed seamless pipes for the afore-described applications also requires the development of new alloying concepts. In particular, adequate high ductility or toughness at low service temperatures is difficult to attain with conventional alloying concepts or conventional processes.

Typically known methods for improvement of the tensile strength are increasing the carbon content or the carbon equivalent by using conventional alloying concepts and/or using micro alloying concepts, based on the mechanism of precipitation hardening.

Micro-alloying elements, such as titanium, niobium and vanadium, are, generally speaking, employed to increase the strength. Depending on the alloying design, Titanium can already partially precipitate at high temperatures in the liquid phase forming very coarse titanium nitride. Niobium forms niobium (C, N) precipitates at lower temperatures. With further decreasing temperature, vanadium carbides and nitrides are also formed.

Nevertheless exceedingly coarse precipitates of these micro-alloying elements frequently impair the ductility and toughness. Accordingly, the concentration of these alloying elements is generally limited. In addition, the concentration of carbon and nitrogen required for the proper formation of precipitates must be taken into account, making the whole chemical composition definition complex.

In order to overcome these aforementioned drawbacks, new alloying concepts based on the addition of elements suitable to increase tensile strength by solution hardening in combination with micro-alloying techniques have been duly investigated.

Some offshore applications are mainly performed in corrosive media, and particularly in presence of hydrogen sulphide ($H_2S$), which is responsible for a dangerous form of cracking in low alloy steels with a high yield strength, known as sulphide stress cracking (SSC).

Sulphide stress cracking resistance is thus of particular importance for oil companies since it is relevant to the safety of equipment.

Furthermore, offshore pipeline installation can be performed by reel-laying. However, the process of reeling on and off the reel drum does lead to significant plastic deformation of the pipes. Indeed, during reel-laying, repeated plastic strain is generated into the pipeline, which may affect strength and ductility of the line pipe material and alters its corrosion resistance, especially in presence of hydrogen sulphide.

Therefore there is a real need to provide steels suitable for harsh environment, and especially for ultra-deep offshore applications that conciliate both good and stable mechanical properties: high strength, high toughness and suitable sulphide stress cracking resistance.

More particularly, the steel should allow the manufacture of seamless pipes that can be used as line pipes, for applications like process pipes, flowlines or risers in the oil and gas industry.

The steel should also present excellent impact properties at service temperatures down to −60° C. (in transversal directions) across the entire wall thickness of the pipe.

An object of the present invention is therefore a steel presenting a yield strength greater than or equal to 485 MPa and having a chemical composition consisting of, in weight %, relative to the total weight of said chemical composition, 0.05≤C≤0.10
0.15≤Si≤0.35
1.20≤Mn≤1.50
0.02≤Cr≤0.10
0.10<Mo≤0.30
0.015≤Al≤0.040
0.002≤N≤0.012

0.10≤Ni≤0.30
0.02≤V≤0.06
0.01≤Nb≤0.03
0.001≤Ti≤0.025;

The balance of the chemical composition of said steel being constituted by Fe and one or more optional residual elements, including P, S, B, Ca, Cu and mixtures thereof; and the chemical composition of said steel satisfying the following formula (1) between C, Cr, Mo, Nb, V and Ti, the contents of which are expressed in weight %.

$$C+Cr+Mo+Nb+V+Ti \leq 0.55 \qquad \text{formula (1).}$$

The steel of the present invention may present a yield strength preferably greater than or equal to 485 MPa, and lower than or equal to 695 MPa, preferably between 495 and 675 MPa.

According to a preferred embodiment of the present invention, steel's yield strength is greater than or equal to 555 MPa and lower than or equal to 705 MPa, in order to comply with grade X80 of API, and preferably steel's yield strength is lower than or equal to 675 MPa, in order to fulfill DNV GL ST-F101 standards.

The yield strength is determined by tensile tests as defined in standards ASTM A370-17 and ASTM E8/E8M-13a.

The steel of the present invention exhibits outstanding hardness and toughness behavior, especially under stringent conditions, namely in presence of a corrosive media. Indeed, the steel of the invention presents excellent mechanical properties and a high toughness at temperatures even down to −80° C., as well as an improved sulphide stress cracking resistance.

The steel of the present invention can particularly be used in tubular products, preferably seamless pipes, exhibiting uniform hardness throughout their wall thickness, even for thinner wall thickness.

As a result, the steel of the present invention is able to lead to seamless pipes having high yield and tensile strengths, a high strain capacity, a low and uniform hardness, namely throughout their entire length and wall thickness, and exhibiting a high and steady toughness performance, while presenting an excellent SSC resistance.

Furthermore, the steel of the present invention is able to lead to seamless pipes displaying high and steady toughness performance, even after being strained and aged, while still presenting an excellent SSC resistance. In other words, the seamless pipes made from the steel of the invention can still be used efficiently under harsh conditions even after undergoing a plastic deformation. In particular, seamless pipes made from the steel of the invention are able to display good and stable mechanical properties during reel-laying.

Thus, another object of the present invention concerns a seamless pipe made from a steel as previously defined.

The present invention also relates to a process for manufacturing a seamless pipe comprising the following successive steps:

(a) providing a steel having a chemical composition as defined previously, and hot forming a seamless pipe thereof
(b) cooling down the seamless pipe obtained at (a) to room temperature,
(c) heating up the cooled seamless pipe obtained at (b) to an austenitization temperature (AT) ranging from 890 to 970° C., preferably between 900 to 930° C. to obtain an austenitized seamless pipe, and then quenching said austenitized seamless pipe down to room temperature to obtain a quenched seamless pipe,
(d) heating up the quenched seamless pipe obtained at (c) to a tempering temperature (TT) ranging from 610 to 680° C., and preferably 630 to 670° C. before keeping said seamless pipe at the temperature TT and then cooling said seamless pipe down to ambient temperature to obtain a quenched and tempered seamless pipe.

The seamless pipe thus obtained from the steel of the invention presents an improved sulphide stress cracking resistance. As previously mentioned, the tubular product and notably the steel seamless pipes are particularly suitable for demanding environments. These demanding environments may incorporate a combination of very challenging factors including, for example, deep-water locations, increased pressure and temperature wells, more corrosive products, and lower design temperatures. These conditions, when added to stringent weldability and toughness criteria already associated with pipe specifications for offshore oil and gas exploration applications, place ever increasing demands on the materials and supply capability.

This product presents the advantages of having good and stable mechanical properties throughout its length and wall thickness, which is the distinction of a substantially uniform microstructure, as well as an excellent SSC resistance.

Thus, the present invention also relates to the use of such a seamless pipe for line pipes, for applications as process pipes, flowlines or risers in the oil and gas industry.

Other subjects, characteristics, aspects and advantages of the invention will emerge even more clearly on reading the description and the examples that follow.

In what follows and unless otherwise indicated, the limits of a range of values are included within this range, in particular in the expressions "of between" and "ranging from . . . to . . . ".

Moreover, the expressions "at least one" and "at least" used in the present description are respectively equivalent to the expressions "one or more" and "greater than or equal to".

Carbon

The chemical composition of the steel according to the present invention contains 0.05≤C≤0.10% by weight, relative to the total weight of said chemical composition. In other words, the chemical composition of the steel contains carbon (C) in a content ranging from 0.05 to 0.10% by weight, relative to the total weight of said chemical composition; it being understood that both lower (0.05% by weight) and higher (0.10% by weight) limits being included.

Carbon significantly increases the tensile strength of the steel according to the present invention. However, it also increases the hardness, which is not desirable for sour-service applications. The objective is to achieve high strength and at the same time low hardness and high toughness. Below 0.05% by weight, the tensile strength decreases significantly and there is a risk to have yield strength below expectation. In other words, the content of carbon has to be higher than or equal to 0.05% by weight in order to ensure grade X70 and/or X80 strengths in case of quenched and tempered seamless pipes.

In addition, above 0.10% by weight, properties such as weldability, ductility and toughness are negatively affected. The steel is indeed more susceptible to peaks of hardness in the Heat Affected Zone, lower toughness at the weld joint and lower sour service resistance.

The carbon content is preferably higher than or equal to 0.06% (0.06%≤C) by weight, relative to the total weight of the chemical composition.

The carbon content is preferably lower than or equal 0.08% (C≤0.08%) by weight, relative to the total weight of the chemical composition.

The carbon content preferably ranges from 0.06 to 0.08% by weight, relative to the total weight of the chemical composition. In other words, the chemical composition of the steel according to the present invention preferably contains 0.06≤C≤0.08% by weight, relative to the total weight of said chemical composition.

Silicon

The chemical composition of the steel according to the present invention further contains 0.15≤Si≤0.35% by weight, relative to the total weight of said chemical composition. In other words, the chemical composition of the steel contains silicon (Si) in a content ranging from 0.15% to 0.35% by weight, relative to the total weight of said chemical composition; it being understood that both lower (0.15% by weight) and higher (0.35% by weight) limits being included.

This element is used as deoxidizer in liquid state and this effect is more effectively obtained with contents above 0.15% by weight. Such contents also increase strength of the steel, especially the ultimate tensile strength, improving the yield ratio (YS/UTS). However, above 0.35% by weight, the toughness of the steel is negatively affected and decreases.

Silicon is also needed to retard softening phenomenon during high temperature tempering and also the derating of the tensile properties of the steel. The silicon content is preferably higher than or equal to 0.23% (0.23%≤Si) by weight, and more preferably higher than or equal to 0.26% (0.26%≤Si) by weight relative to the total weight of the chemical composition.

The silicon content is preferably lower than or equal to 0.31% (Si≤0.31%) by weight, and more preferentially lower than or equal to 30% (Si≤0.30%) by weight, relative to the total weight of the chemical composition.

The silicon content preferably ranges from 0.23 to 0.31% by weight, and more preferentially from 0.26 to 0.30% by weight, relative to the total weight of the chemical composition. In other words, the chemical composition of the steel according to the present invention preferably contains 0.23≤Si≤0.31% by weight, and more preferentially 0.26≤Si≤0.30% by weight, relative to the total weight of said chemical composition.

Manganese

The chemical composition of the steel according to the present invention further contains 1.20≤Mn≤1.50% by weight, relative to the total weight of said chemical composition. In other words, the chemical composition of the steel contains manganese (Mn) in a content ranging from 1.20 to 1.50% by weight, relative to the total weight of said chemical composition; it being understood that both lower (1.20% by weight) and higher (1.50% by weight) limits being included.

Manganese is beneficial to the hot workability of the steel. It also increases the hardenability of the steel. Furthermore, manganese increases the tensile strength of the steel by means of solid solution hardening. Properties such as weldability and toughness are negatively affected when the content of manganese exceeds 1.50% by weight, relative to the total weight of the steel.

The manganese content is preferably higher than or equal to 1.35% (1.35%≤Mn) by weight, and more preferentially 1.40% (1.40%≤Mn) by weight relative to the total weight of the chemical composition.

The manganese content is preferably lower than or equal to 1.45% (Mn≤1.45%) by weight, relative to the total weight of the chemical composition.

The manganese content preferably ranges from 1.35 to 1.45% by weight, and more preferentially from 1.40 to 1.45% by weight, relative to the total weight of the chemical composition. In other words, the chemical composition of the steel according to the present invention preferably contains 1.35≤Mn≤1.45% by weight, and more preferentially 1.40≤Mn≤1.45% by weight relative to the total weight of said chemical composition.

Chromium

The chemical composition of the steel according to the present invention further contains 0.02≤Cr≤0.10% by weight, relative to the total weight of said chemical composition. In other words, the chemical composition of the steel contains chromium (Cr) in a content ranging from 0.02 to 0.10% by weight, relative to the total weight of said chemical composition; it being understood that both lower (0.02% by weight) and higher (0.10% by weight) limits being included.

Chromium improves the hardenability of the steel leading to enhancement of the tensile strengths. But higher content can be deleterious to the weldability of the steels due to increasing on hardness and decreasing the toughness.

The content of chromium has to remain lower than or equal to 0.10% by weight in order to avoid any hard spots (high local hardness spots) during tempering and/or during welding caused by the formation and the precipitation of carbides. Such precipitates are indeed detrimental to SSC.

The chromium content is preferably higher than or equal to 0.06% (0.06%≤Cr) by weight, relative to the total weight of the chemical composition.

The chromium content is preferably lower than or equal to 0.08% (Cr≤0.08%) by weight, relative to the total weight of the chemical composition.

The chromium content preferably ranges from 0.06 to 0.08% by weight, relative to the total weight of the chemical composition. In other words, the chemical composition of the steel according to the present invention preferably contains 0.06≤Cr≤0.08% by weight, relative to the total weight of said chemical composition.

Molybdenum

The chemical composition of the steel according to the present invention further contains 0.10≤Mo≤0.30% by weight, relative to the total weight of said chemical composition. In other words, the chemical composition of the steel contains molybdenum (Mo) in a content ranging from 0.10 to 0.30% by weight, relative to the total weight of said chemical composition; it being understood that both lower (0.10% by weight) and higher (0.30% by weight) limits being included.

Molybdenum increases both yield and tensile strengths and supports the homogeneity of the mechanical properties, the microstructure and the toughness of the steel along the whole length and thickness of the seamless pipe. The presence of molybdenum also makes possible to increase the tempering temperature and to provide thicker seamless pipes, without changing other process parameters, improving thus the hardness of said seamless pipe, as well as its SSC resistance. Molybdenum also increases the hardenability of the steel.

The molybdenum content is preferably higher than or equal to 0.16% (0.16%≤Mo) by weight, and more preferentially higher than or equal to 0.20% (0.20%≤Mo) by weight, relative to the total weight of the chemical composition.

The molybdenum content is preferably lower than or equal to 0.26% (Mo≤0.26%) by weight, and more preferably lower than or equal to 0.24% (Mo≤0.24%) by weight relative to the total weight of the chemical composition.

The molybdenum content preferably ranges from 0.16 to 0.26% by weight, more preferentially from 0.20 to 0.24% by weight relative to the total weight of the steel. In other words, the chemical composition of the steel according to the present invention preferably contains 0.16≤Mo≤0.26% by weight, more preferentially 0.20≤Mo≤0.24% by weight relative to the total weight of said chemical composition.

The chemical composition of the steel according to the present invention preferably satisfies the following formula (2) between Cr and Mo, the contents of which are expressed in weight %, $$Cr+Mo \leq 0.35\% \qquad \text{formula (2)}.$$

In other words, the sum of Cr and Mo contents is preferably lower than or equal to 0.35% by weight, relative to the total weight of the steel. Higher value of these elements combination can cause very high strength combined with undesirable high hardness. Therefore, a very high tempering temperature might be necessary causing recrystallization of the martensite laths formed near to the pipe surfaces during the quenching process. On the other hand, too lower tempering temperature can drive to undesirable too high values for hardness and/or tensile strength.

Aluminum

The chemical composition of the steel according to the present invention further contains 0.015≤Al≤0.040% by weight, relative to the total weight of said chemical composition. In other words, the chemical composition of the steel contains aluminum (Al) in a content ranging from 0.015 to 0.040% by weight, relative to the total weight of said chemical composition; it being understood that both lower (0.015% by weight) and higher (0.040% by weight) limits being included.

Aluminum is a powerful steel deoxidizer and grain refiner. The content of aluminum should not exceed 0.040% by weight because the cleanliness of the steel can be negatively affected by a potential stronger formation of aluminum oxides. However, too low value of Al is also not desirable due to the necessary deoxidation of the steel as well as because of the necessity of a reasonable amount of AlN in order to inhibit the grain growth during rolling, heat treatment and welding operations.

The aluminum content is preferably higher than or equal to 0.20% (0.20%≤Al) by weight, relative to the total weight of the chemical composition.

The aluminum content is preferably lower than or equal to 0.35% (Al≤0.35%) by weight, relative to the total weight of the chemical composition.

The aluminum content preferably ranges from 0.20 to 0.35% by weight, relative to the total weight of the steel. In other words, the chemical composition of the steel according to the present invention preferably contains 0.20≤Al≤0.35% by weight, relative to the total weight of said chemical composition.

Nitrogen

The chemical composition of the steel according to the present invention further contains 0.002≤N≤0.012% by weight, relative to the total weight of said chemical composition. In other words, the chemical composition of the steel contains nitrogen (N) in a content ranging from 0.002 to 0.012% by weight, relative to the total weight of said chemical composition; it being understood that both lower (0.002% by weight) and higher (0.012% by weight) limits being included.

Above 0.012% by weight, nitrogen forms coarse carbonitrides that negatively affect the toughness and it is also deleterious to SSC resistance. Additionally, too high nitrogen can also accelerate the strain ageing of steel pipes that are undertaken to plastic deformation during reel laying process. On the other hand, too lower content of nitrogen is also deleterious due to the reduction of the precipitation of the carbonitrides and/or aluminum nitrides that are necessary for grain growth inhibition, and to increase the tensile properties.

The nitrogen content is preferably higher than or equal to 0.005% (0.005%≤N) by weight, relative to the total weight of the chemical composition.

The nitrogen content is preferably lower than or equal to 0.10% (N≤0.10%) by weight, relative to the total weight of the chemical composition.

The nitrogen content preferably ranges from 0.005 to 0.10% by weight, relative to the total weight of the steel. In other words, the chemical composition of the steel according to the present invention preferably contains 0.005≤N≤0.10% by weight, relative to the total weight of said chemical composition.

Nickel

The chemical composition of the steel according to the present invention further contains 0.10≤Ni≤0.30% by weight, relative to the total weight of said chemical composition. In other words, the chemical composition of the steel contains nickel (Ni) in a content ranging from 0.10 to 0.30% by weight, relative to the total weight of said chemical composition; it being understood that both lower (0.10% by weight) and higher (0.30% by weight) limits being included.

Nickel improves the steel hardness. It increases yield strength, as well as tensile strength. Nickel is a very important element to improve the toughness, especially at very low temperatures.

The nickel content is preferably higher than or equal to 0.12% (0.12%≤Ni) by weight, relative to the total weight of the chemical composition.

The nickel content is preferably lower than or equal to 0.20% (Ni≤0.20%) by weight, relative to the total weight of the chemical composition.

The nickel content preferably ranges from 0.12 to 0.20% by weight, relative to the total weight of the steel. In other words, the chemical composition of the steel according to the present invention preferably contains 0.12≤Ni≤0.20% by weight, relative to the total weight of said chemical composition.

Vanadium

The chemical composition of the steel according to the present invention further contains 0.02≤V≤0.06% by weight, relative to the total weight of said chemical composition. In other words, the chemical composition of the steel contains vanadium (V) in a content ranging from 0.02 to 0.06% by weight, relative to the total weight of said chemical composition; it being understood that both lower (0.02% by weight) and higher (0.06% by weight) limits being included.

Vanadium increases the tensile properties due to precipitation hardening phenomenon. Above 0.06% by weight, vanadium precipitates (nitrides and/or carbides) increase the risk of having peaks of hardness at Heat Affected Zone as well as a scattering in toughness values at low temperatures and/or a shift of transition temperatures to higher temperatures. Consequently, the toughness properties are negatively impacted by such contents. On the other hand, too lower content of vanadium does not increase the strength of the steels. Vanadium also has a minor effect on the hardenability of steels.

The vanadium content is preferably higher than or equal to 0.03% (0.03%≤V) by weight, relative to the total weight of the chemical composition.

The vanadium content is preferably lower than or equal to 0.05% (V≤0.05%) by weight relative to the total weight of the chemical composition.

The vanadium content preferably ranges from 0.03 to 0.05% by weight relative to the total weight of the chemical composition. In other words, the chemical composition of the steel according to the present invention preferably contains 0.03≤V≤0.05% by weight relative to the total weight of said chemical composition.

Niobium

The chemical composition of the steel according to the present invention further contains 0.01≤Nb≤0.03% by weight, relative to the total weight of said chemical composition. In other words, the chemical composition of the steel contains niobium (Nb) in a content ranging from 0.01 to 0.03% by weight, relative to the total weight of said chemical composition; it being understood that both lower (0.01% by weight) and higher (0.03% by weight) limits being included.

Niobium leads to carbide and/or nitride precipitates resulting into a fine grain size microstructure by grain boundary pinning effects and improved tensile strength. However, above 0.03% by weight, niobium can have a negative impact in the hardness, especially at the Heat Affected Zone. And then it can also have a negative impact on the toughness through the formation of coarse precipitates.

The niobium content is preferably higher than or equal to 0.02% (0.02%≤Nb) by weight, relative to the total weight of the chemical composition.

The niobium content is preferably lower than or equal to 0.028% (Nb≤0.028%) by weight relative to the total weight of the chemical composition.

The niobium content preferably to the total weight of the chemical composition. In other words, the chemical composition of the steel according to the present invention preferably contains 0.02%≤Nb≤0.028% by weight relative to the total weight of said chemical composition.

The chemical composition of the steel according to the present invention preferably satisfies the following formula (3) between Nb and V, the contents of which are expressed in weight %, $$Nb+V \leq 0.07 \qquad \text{formula (3).}$$

In other words, the sum of Nb and V contents is preferably lower than or equal to 0.07% by weight, relative to the total weight of the steel in order to avoid any hardness peak in the heat affected zone (HAZ) and to improve the SSC resistance in this region.

Titanium.

The chemical composition of the steel according to the present invention further contains 0.001%≤Ti≤0.025%; by weight, relative to the total weight of said chemical composition. In other words, the chemical composition of the steel contains titanium (Ti) in a content up to 0.025% by weight, relative to the total weight of said chemical composition; it being understood that upper limit is included (0.025% by weight).

Above 0.025% by weight, titanium can lead to the coarse carbide and/or nitride precipitates, which drive to a poorer grain refinement control as well as to a higher susceptibility to secondary cracking on SSC tests. In addition, at such contents, titanium negatively affects the yield strength and the toughness of the steel.

The titanium content is preferably in the range of 0.005≤Ti≤0.020% by weight, relative to the total weight of the chemical composition.

The chemical composition of the steel according to the present invention preferably satisfies the following formula (4) between Nb, V and Ti, the contents of which are expressed in weight %, $$Nb+V+Ti \leq 0.095 \qquad \text{formula (4).}$$

In other words, the sum of Nb, V and Ti contents is preferably lower than or equal to 0.095% by weight, relative to the total weight of the steel. This element combination is important to avoid hardness spot in the heat affected zone of girth welds, improving the SSC resistance and the toughness in this region.

Balance and Residual Elements

The balance of the chemical composition of the steel according to the present invention is made of Fe and residual elements resulting from the steel production and casting processes, including P, S, B, Ca, Cu and mixtures thereof.

In some embodiments, the chemical composition contains residual elements chosen from P, S, B, Ca, Cu and mixtures thereof.

The term "residual elements" refers to inevitable elements resulting from the steel production and casting processes.

The contents of the residual, expressed in weight %, relative to the total weight of said chemical composition, are preferably as follows:

P≤0.012
S≤0.003
B≤0.0005
Ca≤0.004
Cu≤0.12

Boron

The boron (B) content is preferably lower than or equal to 0.0005% by weight, relative to the total weight of the chemical composition of the steel. Above this content, boron can negatively impact the weldability due to hard spots formation at the Heat Affected Zone. More preferably, the steel composition is boron free. Boron free composition contains Boron less than 0.0005% by weight, relative to the total weight of the chemical composition of the steel.

Copper

The chemical composition of the steel according to the present invention may further contain Cu≤0.12% by weight, relative to the total weight of said chemical composition. In other words, the chemical composition of the steel may further contain copper (Cu) in a content lower than or equal to 0.12% by weight, relative to the total weight of said chemical composition. Above 0.12% by weight, copper may lead to the surface defects due to the hot shortness phenomenon.

Other elements such as Ca and REM (rare earth metals) can also be present as unavoidable residual elements. P and S decrease SSC resistance and the toughness.

Carbon Equivalent and Pcm are calculated parameters in weight percent, relating the combined effects of different alloying elements in steels to an equivalent amount of carbon.

The desire tensile strength can be varied by changing the amount of carbon and other alloying elements by means of a proper heat treatment. These parameters are very important to enable a better weldability, toughness and tensile strength. The lower Carbon Equivalent and Pcm, the better will be the weldability and toughness. But it cannot be too low, since the minimum tensile strength will not be reached.

The present invention also relates to a seamless pipe, made from a steel as previously defined.

According to one embodiment of the invention, seamless pipe are of the X80 grade, with a steel yield strength between 555 MPa and 740 MPa, a pipe wall thickness between a 15.1 and 35 mm, and such that the steel chemical composition contains in weight %, relative to the total weight of said chemical composition: 0.16≤Mo≤0.26, and preferably 0.20≤Mo≤0.24.

According to another embodiment of the invention, seamless pipe are of the X70 grade, with a steel yield strength between 485 MPa and 635 MPa, a pipe wall thickness between 9.3 and 40 mm, and such that the steel chemical composition contains in weight %, relative to the total weight of said chemical composition: 0.10≤Mo≤0.21.

Another object of the present invention concerns a process for manufacturing a seamless pipe as previously defined.

More particularly, a seamless pipe made from steel according to the present invention is obtained according to conventional hot forming methods.

For example, the steel according to the present invention may be melted by commonly-used melting practices and commonly-used casting process such as the continuous casting or the ingot casting-blooming methods.

The steel is then heated to a temperature ranging from 1100° C. and 1300° C., so that at all points the temperature reached is favorable to the high rates of deformation the steel will undergo during hot forming.

Preferably the maximum temperature is lower than 1300° C. to avoid burning. Below 1100° C., the hot ductility of the steel is negatively impacted. The steel is advantageously hot formed in at least one step by rolling.

A seamless pipe having the desired dimensions is thus obtained. This tubular product presents preferably a wall thickness ranging from 9.3 to 50 mm, and more preferably from 15 to 35 mm.

The seamless pipe is then austenitized, i.e. heated up to an austenitization temperature (AT) to achieve a homogeneous microstructure along its length and across the wall section.

The seamless pipe made of steel according to the present invention is then kept at the austenitization temperature AT for an austenitization time At of at least 2 minutes, the objective being that at all points of the tube, the temperature reached is at least equal to the austenitization temperature. The temperature should be homogeneous throughout the tube. The austenitization time At shall not be above 60 minutes because above such duration, the austenite grains grow undesirably large and lead to a coarser final structure. This would be detrimental to toughness and SSC resistance.

The austenitized seamless pipe made of steel according to the present invention is then cooled to the ambient temperature, for example in water (water quench).

The quenched seamless pipe made of steel according to the present invention is then tempered, i.e. heated up at a tempering temperature (TT) ranging from 630 to 670° C., preferably from 630 to 665° C., and more preferentially from 635 to 660° C.

The tempering temperature has to remain below 670° C. in order to avoid any recrystallization of martensite underneath the outer and inner pipe surfaces, that would be deleterious to the SSC resistance as well as the tensile properties and fatigue resistance, but higher than 630° C. to keep the homogeneous microstructure all along the seamless pipe. The tempering temperature has to remain above 630° C., in order to avoid peaks of hardness at ID and OD surfaces Such tempering step is done during a tempering time Tt, preferably between 20 and 60 minutes. This leads to a quenched and tempered steel seamless pipe.

The quenched and tempered steel seamless pipe according to the invention is then cooled down to the ambient temperature using either water or air cooling.

At the end of the process of the present invention, the seamless pipe thus obtained may further undergo additional finishing steps, such as sizing, coating or straightening.

The quenched and tempered steel seamless pipe is then useful for for line pipes, for applications as process pipes, flowlines or risers in the oil and gas industry.

Thus the present invention also concerns use of a seamless pipe as previously defined for line pipes.

Other characteristics and advantages of the invention are given in the following experimental section, which should be regarded as illustrative and not limiting the scope of the present application.

EXAMPLES

I. Example 1—X80

1. Tested Steels

The following compositions of seamless pipe's steels according to the present invention (A1), (A2) and (A3) have been prepared from the elements indicated in the table 1 below, the amounts of which are expressed as percent by weight, relative to the total weight of the chemical composition.

TABLE 1

| Steel | | A1 | A2 | A3 |
| --- | --- | --- | --- | --- |
| Chemical composition | C | 0.075 | 0.062 | 0.075 |
| (Unit: mass %, | Si | 0.273 | 0.277 | 0.298 |
| Balance: Fe and | Mn | 1.428 | 1.432 | 1.417 |
| residual elements) | Cr | 0.062 | 0.065 | 0.078 |
| | Mo | 0.172 | 0.215 | 0.241 |
| | Al | 0.027 | 0.025 | 0.025 |
| | N | 0.005 | 0.0072 | 0.0088 |
| | Ni | 0.167 | 0.18 | 0.164 |
| | V | 0.039 | 0.045 | 0.050 |
| | Nb | 0.0215 | 0.0209 | 0.0236 |
| | Ti | 0.0055 | 0.0052 | 0.0055 |
| | P | 0.006 | 0.009 | 0.01 |
| | S | 0.0017 | 0.0023 | 0.0019 |
| | B | 0.0004 | 0.0004 | 0.0004 |

TABLE 1-continued

| Steel | | A1 | A2 | A3 |
|---|---|---|---|---|
| | Ca | 0.0009 | 0.0012 | 0.0015 |
| | Cu | 0.029 | 0.05 | 0.04 |
| | Pcm | 0.181 | 0.173 | 0.190 |
| | Ceq | 0.381 | 0.381 | 0.404 |
| C + Cr + Mo + Nb + V + Ti | | 0.372 | 0.410 | 0.4988 |
| Nb + V | | 0.060 | 0.065 | 0.065 |
| Nb + V + Ti | | 0.065 | 0.071 | 0.070 |
| Cr + Mo | | 0.234 | 0.280 | 0.319 |

2. Protocol

The steels (A1), (A2) and (A3) having the chemical compositions described in the table 1 above have been heated and then hot formed into seamless steel pipes of the desired dimensions by hot working using a rolling mill at 1250° C.

The seamless steel pipes thus obtained have a wall thickness (WT) equal to 15.9 mm or 25.4 mm.

After hot forming, the seamless steel pipes have undergone the following process conditions summarized in the table 2, with:
AT: Austenitization temperature in ° C.
At: Austenitization time in seconds
TT: Tempering temperature in ° C.
Tt: Tempering time in seconds The following steps, defined in table 2 and correspond to steps (c) and (d) of the process of the present invention.

TABLE 2

| Steel (WT) | AT (° C.) | At (s) | TT (° C.) | Tt (s) |
|---|---|---|---|---|
| A1 (25.4 mm) | 920 | 900 | 640 | 2400 |
| A2 (25.4 mm) | 920 | 900 | 644 | 2400 |
| A3 (25.4 mm) | 920 | 900 | 664 | 2400 |
| A1 (15.9 mm) | 920 | 900 | 644 | 2400 |
| A2 (15.9 mm) | 920 | 900 | 653 | 2400 |

The mechanical properties, fracture mechanics and SSC behavior have then been evaluated for each steel (A1), (A2) (A3) according to the following methods.

3. Hardness Behavior

The hardness behavior has been evaluated according to the standard ISO 6507-1.

Each pipe (A1, 25.4 mm), (A2, 25.4 mm), (A3, 25.4 mm), (A1, 15.9 mm) and (A2, 15.9 mm) has been cut in its transversal direction and divided in four quadrants. Four indentations on its outer wall, mid wall and inner wall have been performed on both bottom and head ends of the pipe. In other words, 16 measurements have been performed for each wall at the bottom end of the pipe and 16 others have been performed at the head end.

Figure 1A:
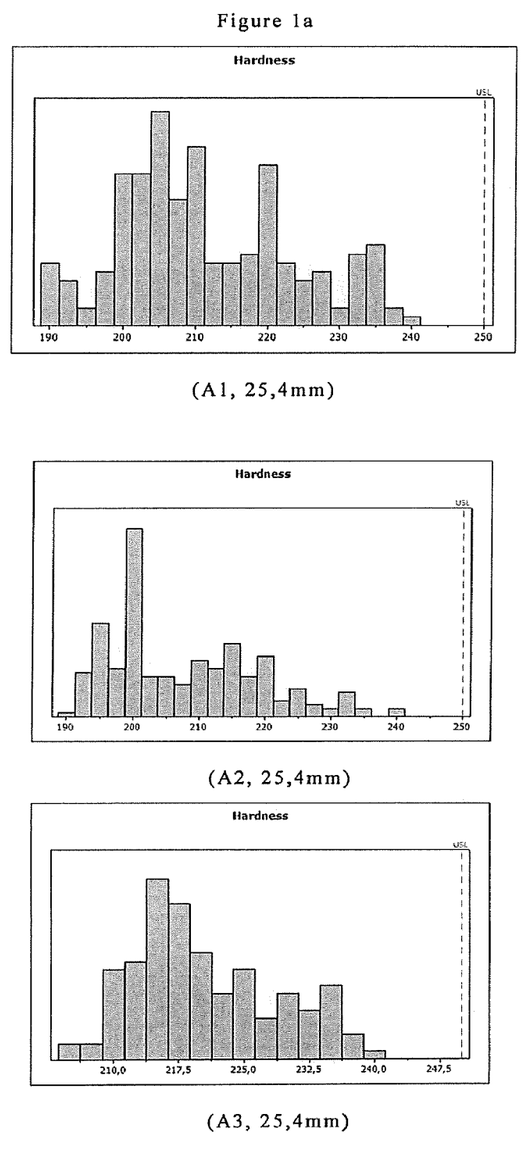
FIG. 1a and FIG. 1b show graphs representing all individual values of hardness measurements performed on different positions (bottom and head ends of the pipe), as well as on cross section (outer wall, mid wall and inner wall) for each pipe (A1, 25.4 mm), (A2, 25.4 mm), (A3, 25.4 mm), (A1, 15.9 mm) and (A2, 15.9 mm).
Figure 1B:
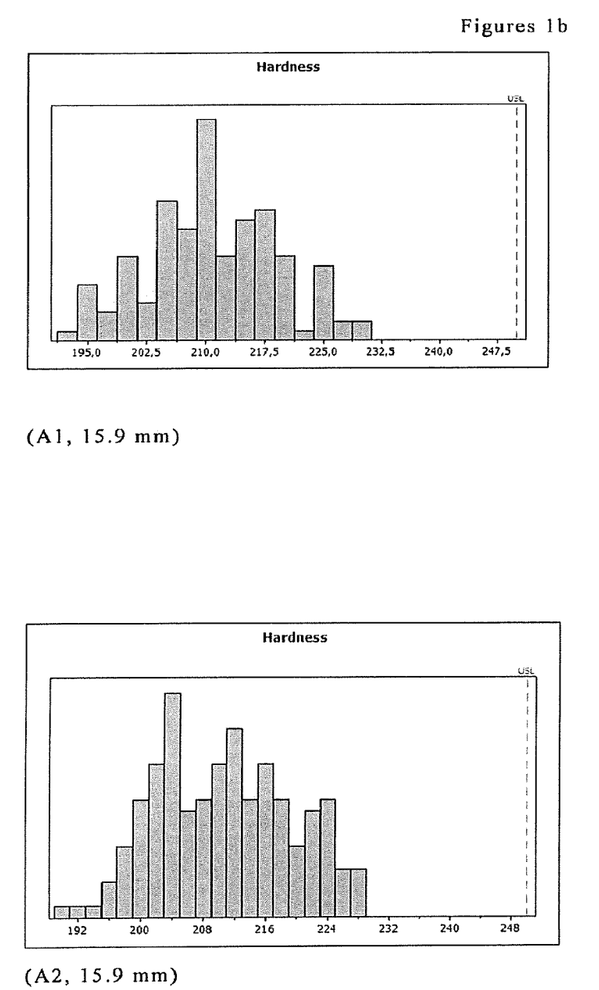

The results are shown on FIG. 1a (representing the results obtained for pipes (A1, 25.4 mm), (A2, 25.4 mm) and (A3, 25.4 mm)) and FIG. 1b (representing the results obtained for pipes (A1, 15.9 mm) and (A2, 15.9 mm)).

Each graph represents all individual values of hardness measurements performed on different positions (bottom and head ends of the pipe), as well as on cross section (outer wall, mid wall and inner wall) for each pipe (A1, 25.4 mm), (A2, 25.4 mm), (A3, 25.4 mm), (A1, 15.9 mm) and (A2, 15.9 mm).

The results thus obtained clearly show that pipes made of steel according to the present invention comply with the requirements of DNVGL-ST-F101. Indeed, for both thicker (FIG. 1a) and thinner (FIG. 1b) walls, all hardness values are well below 250 HV10. This good level is even improved for the thinner walls (FIG. 1b) since these values are mostly below 230 HV10.

4. Tensile Properties

The tensile properties have been evaluated according to the standard ASTM A370.

Figure 2A:
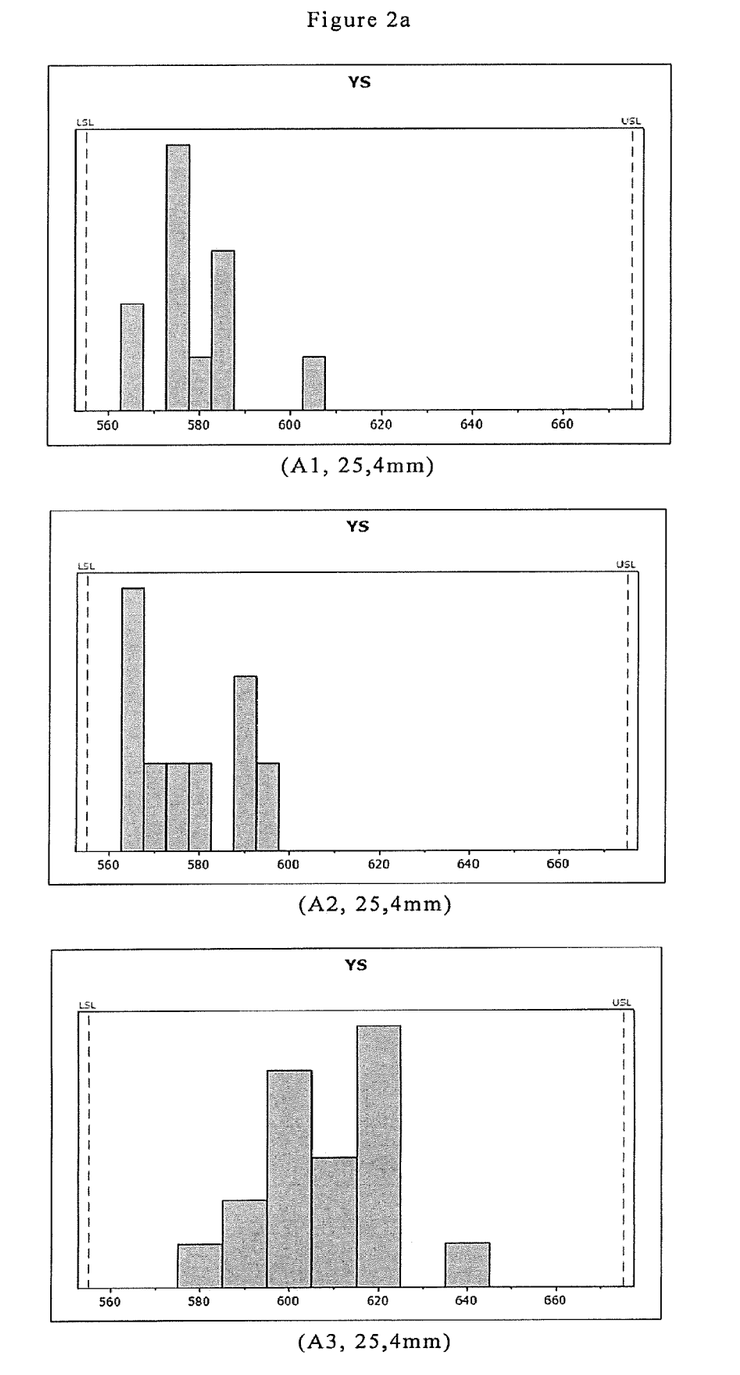
FIG. 2a and FIG. 2b show graphs representing the yield strength values measured for each pipe (A1, 25.4 mm), (A2, 25.4 mm), (A3, 25.4 mm), (A1, 15.9 mm) and (A2, 15.9 mm).
Figure 2B:
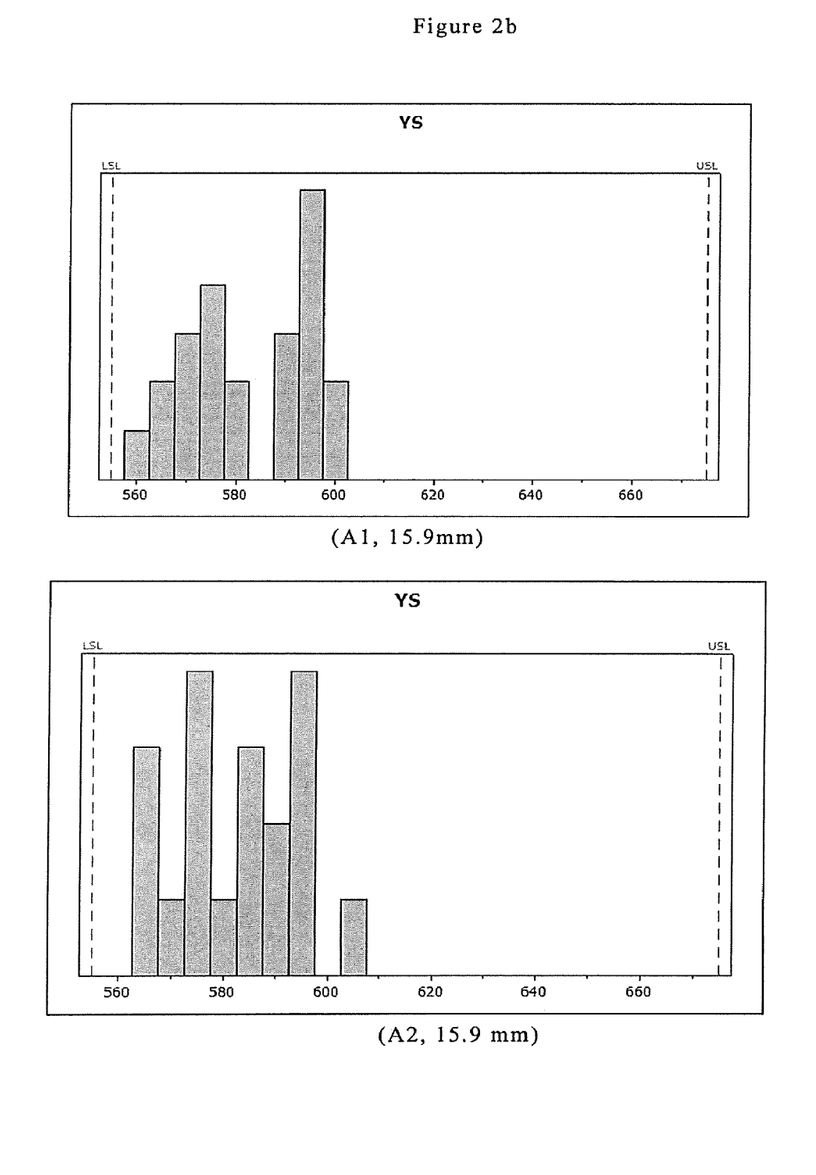

The tensile properties, represented by the yield strength, are shown on FIG. 2a (representing the results obtained for pipes (A1, 25.4 mm), (A2, 25.4 mm) and (A3, 25.4 mm)) and FIG. 2b (representing the results obtained for pipes (A1, 15.9 mm) and (A2, 15.9 mm)).

Each graph represents the yield strength values measured for each pipe (A1, 25.4 mm), (A2, 25.4 mm), (A3, 25.4 mm), (A1, 15.9 mm) and (A2, 15.9 mm).

The results thus obtained clearly show that pipes made of steel according to the present invention present a yield strength greater than or equal to 555 MPa (80 ksi). In other words, the steel according to the present invention corresponds to the grade X80.

5. HIC Resistance

The HIC test, corresponding to the test according to NACE TM 0284 method, consists in immersing the test pipes in a solution (solution A) of 100% $H_2S$. The testing duration is 96 hours. All specimens (A1, 25.4 mm), (A2, 25.4 mm), (A3, 25.4 mm), (A1, 15.9 mm) and (A2, 15.9 mm) passed with no cracks, namely, crack sensitivity ratio (CSR), crack length ratio (CLR) and crack thickness ratio (CTR) are all zero.

6. SSC Resistance

The SSC resistance corresponds to the sulphide stress corrosion cracking resistance. This SSC resistance has been evaluated for each pipe (A1, 25.4 mm), (A2, 25.4 mm) (A3, 25.4 mm), (A1, 15.9 mm) and (A2, 15.9 mm) according to the three following methods:

the first SSC test, corresponding to standard NACE TM0177-2016 Method A, consists in immersing the pipes under axial load in an aqueous solution (Solution A), which consists of 5.0 wt. % of sodium chloride and 0.5 wt. % glacial acetic acid dissolved in distilled water. The pH of the solution before or after $H_2S$ saturation was in the range of 2.6 and 2.8. The solution temperature is 24° C. The testing duration is 720 hours, and the applied stress is 90% of the actual yield strength.

the second SSC test, corresponding to Four point bend test—ASTM G-39 standard, consists in immersing the pipes under load in an aqueous solution (Solution A), which consists of 5.0 wt. % of sodium chloride and 0.5 wt. % glacial acetic acid dissolved in distilled water. The pH of the solution before or after $H_2S$ saturation was in the range of 2.6 and 2.8. The solution temperature is 24° C. The testing duration is 720 hours, and the applied stress is 90% of the actual yield strength.

The absence of failure was then determined.

After 720 hours, the pipes according to the present invention presented no failures and no secondary cracks across the section. All the pipes show an excellent sulphide stress cracking resistance and can therefore be used in severe sour conditions.

7. Test after Straining and Ageing

The steel composition (A1) according to the present invention has been prepared from the elements indicated in the table 1 above. The steel (A1) thus obtained has then been hot formed according to the protocol previously mentioned in example 1 and the two following pipes (A1a) and (A1b) have been produced.

After quenching and tempering, the pipe (A1b) has been aged and deformed according to the following protocol:

The full wall strip specimen (A1b) has been submitted to uniaxial tensile stress causing a plastic deformation of 2% (A1b-2%) or of 5% (A1b-5%). The pipes have then been aged at 250° C. for 1 hour. This protocol is intended to simulate the impact of reeling on the mechanical properties of the pipe at low temperatures.

The mechanical properties, fracture mechanics and SSC behavior of the pipe (A1a) and of the aged and deformed pipes (A1b-2%) and (A1b-5%) have then been evaluated according to the following methods.

7.1. Hardness Behavior

The hardness behavior has been evaluated according to the standard ISO 6507-1, as previously mentioned in example 1.

The results obtained with (A1b-2%), having a wall thickness of 15.9 mm, are mentioned in the table 3 here below. The following values correspond to the means of the four measurements of two of the four quadrants for each ends.

TABLE 3

| | Hardness (HV10) | | | |
|---|---|---|---|---|
| | A1b-2% | Outer wall | Mid wall | Inner wall |
| Pipe trailing end | Quadrant 1 | 215 | 220 | 237 |
| | Quadrant 2 | 223 | 224 | 240 |
| Pipe leading end | Quadrant 1 | 245 | 219 | 229 |
| | Quadrant 2 | 219 | 224 | 246 |

The results thus obtained clearly show that even after straining and ageing, pipes made of steel according to the present invention comply with the requirements of DNVGL-ST-F101. Indeed, all hardness values are below 250 HV10.

7.2. Impact Energy Test

For each pipe (A1a) and (A1b-5%), impact energy values have been determined according to the Charpy impact test ASTM E23—Type A.

Three notches located on different positions across the wall thickness (outer wall, mid wall and inner wall) were performed on pipes (A1a) and (A1b-5%). The pipes were then placed at different temperatures ranging from −10° C. to −80° C.

The absorbed energy (Joule) and the shear area (%) were then measured after impact Charpy tests at different temperatures.

The results are given in the table 4 below for pipe (A1a) and pipe (A1b-5%). The results shown in the table correspond to the mean values of the three measurements using full size specimens.

TABLE 4

| | Charpy Impact Test | | | |
|---|---|---|---|---|
| Test T | Absorbed energy (J) | | Shear area (%) | |
| (° C.) | A1a | A1b-5% | A1a | A1b-5% |
| −80 | 348 | 166 | 100 | 60 |
| −60 | 343 | 251 | 100 | 100 |
| −30 | 377 | 272 | 100 | 100 |
| −10 | 385 | 280 | 100 | 100 |

The results thus obtained show that pipes made of steel according to the present invention present no brittle fracture even at −80° C. for the as-quenched and tempered conditions (A1a).

In addition, even after a severe uniaxial deformation of 5% followed by ageing at 250° C. for 1 h, this good ductile behavior is kept for temperatures down to −60° C. (A1b-5%).

7.3. Crack Tip Opening Displacement (CTOD)

This method is used to determine when the crack starts to propagate.

Three specimen were cut on each pipes (A1a), (A1b-2%) and (A1b-5%) using an electrical discharging machine (EDM) in order to guarantee narrow notches from which fatigue pre-cracks can extend by fatigue. The tests and results evaluations followed the standard BS 7448-1. The tested pipes had a wall thickness of 25.4 mm.

DNVGL-ST-F101 specification establishes a minimum CTOD value of 0.150 mm for the design temperature.

The CTOD values are given in the table 5 here below.

TABLE 5

| | CTOD | | | |
|---|---|---|---|---|
| | | CTOD values (mm) | | |
| Steel | T (° C.) | notch 1 | notch 2 | notch 3 | mean |
| A1a | −20° C. | 1.24 | 1.32 | 1.30 | 1.29 |
| A1a | −60° C. | 1.28 | 1.27 | 1.20 | 1.25 |
| A1b-2% | −60° C. | 1.19 | 1.28 | 1.20 | 1.23 |
| A1b-5% | −60° C. | 1.08 | 1.13 | 1.10 | 1.10 |

The results thus obtained show that the CTOD values of the steel according to the present invention are much higher than 0.150 mm. Indeed, even at −60° C., the CTOD values are higher than 1.10 mm.

In addition, all the pipes (A1a), (A1b-2%) and (A1b-5%) present a ductile fracture mode.

Both impact energy and CTOD tests show that the steel of the present invention present an excellent resistance to stress. Even after deformation and ageing, the pipes remain tough for temperatures down to −60° C.

7.4. SSC Resistance

The SSC resistance has been evaluated for each pipes (A1a, 25.4 mm), (A1a, 15.9 mm) and (A1b-5%) according to the methods previously mentioned in example 1.

After 720 hours, none of the pipes presented neither failures nor secondary cracks. All the pipes show an excellent sulphide stress cracking resistance, even after straining and ageing, and can therefore be used in severe sour conditions.

II. Example 2—X70

1. Tested Steels

The following compositions of seamless pipe's steels according to the present invention (A4) and (A5) have been prepared from the elements indicated in the table 1 below, the amounts of which are expressed as percent by weight, relative to the total weight of the chemical composition.

TABLE 6

| Steel | | A4 | A5 |
|---|---|---|---|
| Chemical composition | C | 0.071 | 0.062 |
| (Unit: mass %, | Si | 0.272 | 0.277 |
| Balance: Fe and | Mn | 1.419 | 1.432 |
| residual elements) | Cr | 0.072 | 0.065 |
| | Mo | 0.107 | 0.120 |
| | Al | 0.029 | 0.025 |

TABLE 6-continued

| Steel | | A4 | A5 |
|---|---|---|---|
| | N | 0.0051 | 0.0072 |
| | Ni | 0.168 | 0.18 |
| | V | 0.040 | 0.045 |
| | Nb | 0.0213 | 0.0209 |
| | Ti | 0.0023 | 0.0052 |
| | P | 0.007 | 0.009 |
| | S | 0.0016 | 0.0023 |
| | B | 0.0005 | 0.0004 |
| | Ca | 0.0013 | 0.0012 |
| | Cu | 0.029 | 0.05 |
| | Pcm | 0.172 | 0.173 |
| | Ceq | 0.364 | 0.381 |
| C + Cr + Mo + Nb + V + Ti | | 0.2962 | 0.3136 |
| Nb + V | | 0.0552 | 0.0613 |
| Nb + V + Ti | | 0.0572 | 0.0636 |
| Cr + Mo | | 0.179 | 0.185 |

2. Protocol

The steels (A4) and (A5) having the chemical compositions described in the table 6 above have been heated and then hot formed into seamless steel pipes of the desired dimensions by hot working using a rolling mill at 1250° C.

The seamless steel pipes thus obtained have a wall thickness (WT) equal to 25.4 mm.

After hot forming, the seamless steel pipes have undergone the following process conditions:
AT: Austenitization temperature at 920° C.
At: Austenitization time during 900 seconds
TT: Tempering temperature at 650° C.
Tt: Tempering time during 2400 seconds The mechanical properties, fracture mechanics, HIC and SSC behavior have then been evaluated for each steel (A4) and (A5) according to the following methods.

3. Hardness Behavior

The hardness behavior has been evaluated according to the standard ISO 6507-1, according the method described for Example 1.

Figure 3:
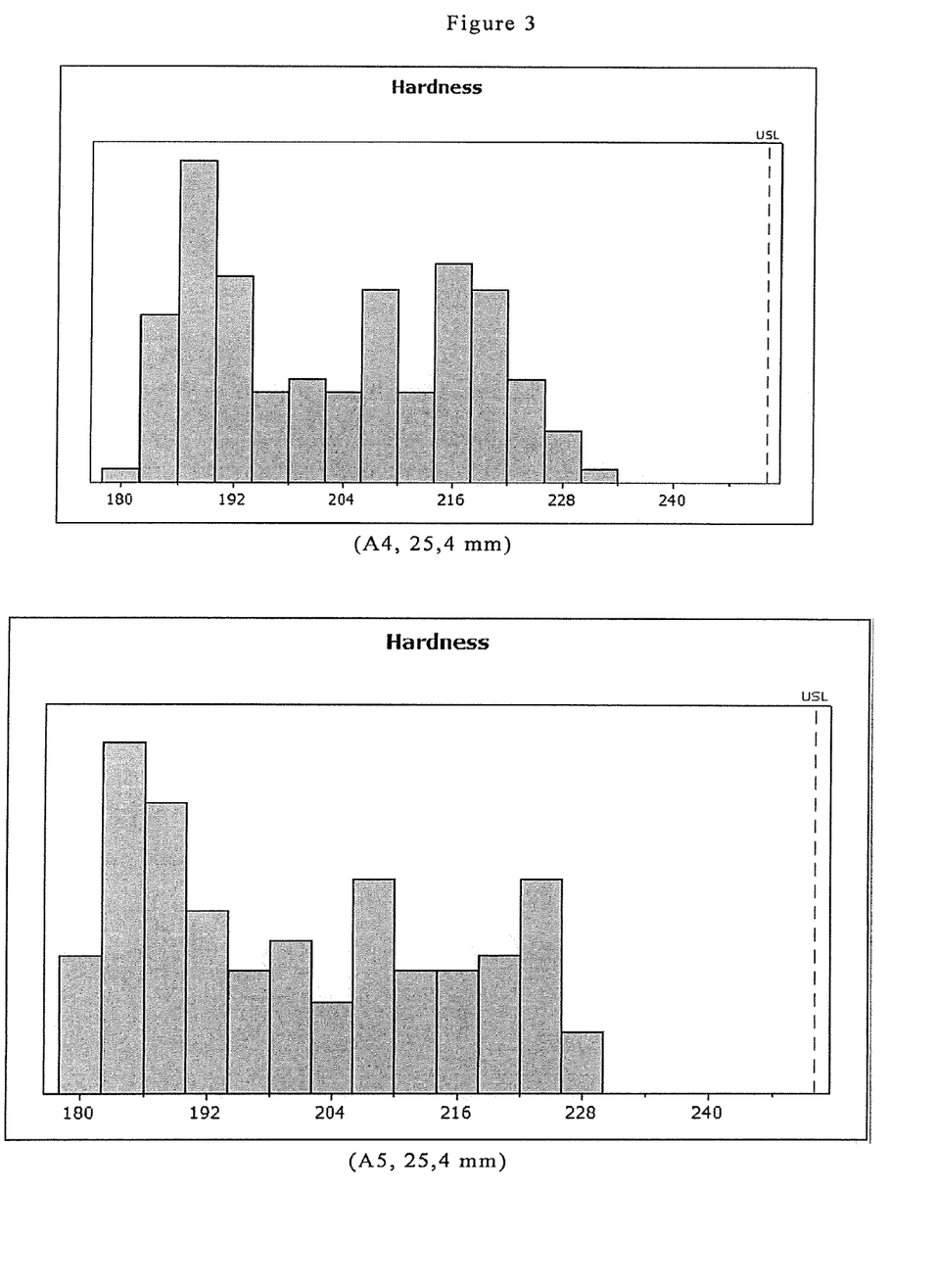
FIG. 3 shows graphs representing all individual values of hardness measurements performed for each pipe (A4, 25.4 mm) and (A5, 25.4 mm).

The results are shown on FIG. 3.

The results thus obtained clearly show that pipes made of steel according to the present invention comply with the requirements of DNVGL-ST-F101. All hardness values are below 240 HV10.

4. Tensile Properties

The tensile properties have been evaluated according to the standard ASTM A370.

Figure 4:
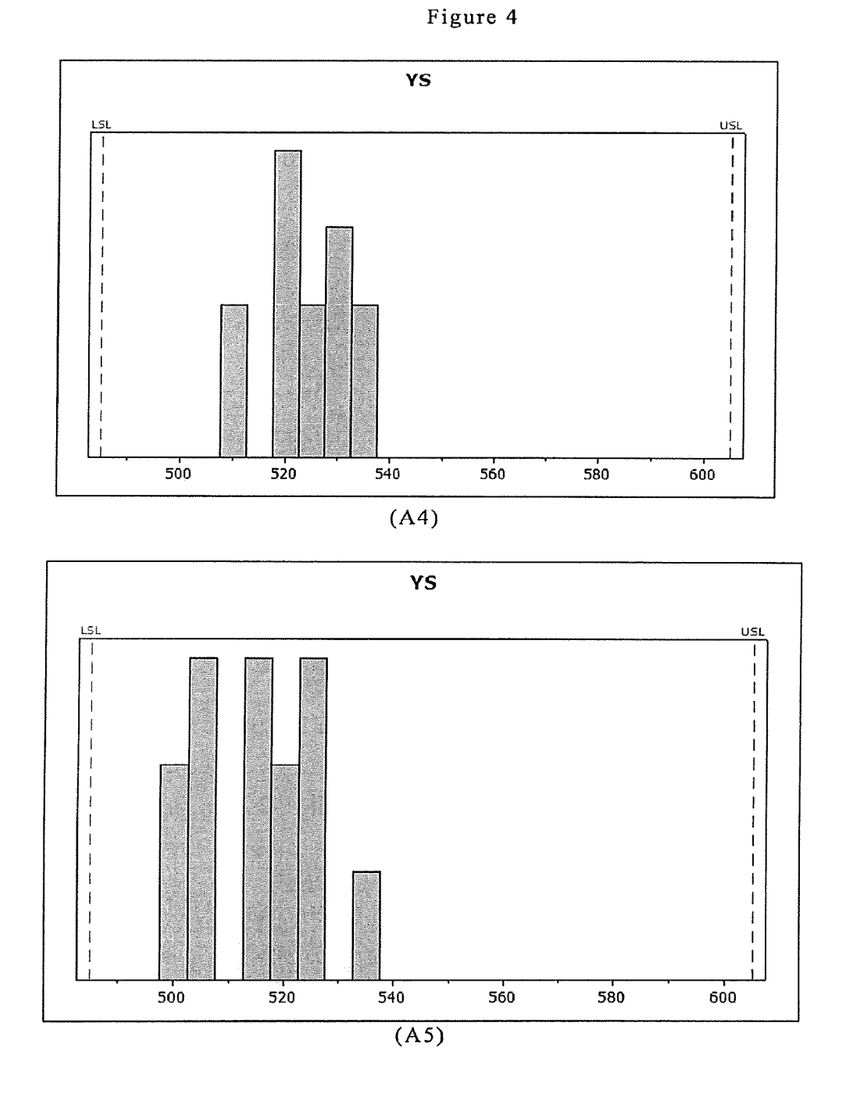
FIG. 4 shows graphs representing the yield strength values measured for each pipes (A4, 25.4 mm) and (A5, 25.4 mm).

The tensile properties, represented by the yield strength, are shown on FIG. 4. Each graph represents the yield strength values measured for each pipes (A4, 25.4 mm) and (A5, 25.4 mm).

The results thus obtained clearly show that pipes made of steel according to the present invention present a yield strength greater than or equal to 485 MPa (70 ksi).

5. HIC Resistance

Pipes (A4, 25.4 mm) and (A5, 25.4 mm) passed the HIC test, corresponding to the test according to NACE TM 0284 method, with no cracks after 96 hours, namely, crack sensitivity ratio (CSR), crack length ration (CLR) and crack thickness ratio (CTR) are all zero.

6. SSC Resistance

Pipes (A4, 25.4 mm) and (A5, 25.4 mm) passed the SSC test, corresponding to the test according to NACE TM0177-2016 Method A, with no failures and no secondary cracks after 720 hours. All the pipes showed an excellent sulphide stress cracking resistance and can therefore be used in severe sour conditions.

7. Test after Straining and Ageing

The steel composition (A4) and (A5) according to the present invention has been prepared from the elements indicated in the table 6 above. The steel thus obtained has then been hot formed according to the protocol previously mentioned in example 2. After quenching and tempering, the pipe has been aged and deformed according to the following protocol: an uniaxial tensile stress causing a plastic deformation of 5% was applied to the full wall pipe, and then the pipes have then been aged at 250° C. for 1 hour.

7.1. Hardness Behavior

The hardness behavior has been evaluated according to the standard ISO 6507-1, as previously mentioned in example 1.

The maximum hardness measurement obtained was 240HV10. The results thus obtained clearly show that even after straining and ageing, pipes made of steel according to the present invention comply with the requirements of DNVGL-ST-F101. Indeed, all hardness values are well below 250 HV10.

7.2. Impact Energy Test

For pipes according to Steel (A4), impact energy values have been determined according to the Charpy impact test ASTM E23—Type A, using full size specimen.

The results are given in the table 7 below for pipe (A4) without straining and ageing, and pipe (A4-5%) after straining and ageing. The results shown in the table correspond to the mean values of the three measurements using full size specimens.

TABLE 7

| | Charpy Impact Test | | | |
|---|---|---|---|---|
| Test T | Absorbed energy (J) | | Shear area (%) | |
| (° C.) | A4 | A4-5% | A4 | A4-5% |
| −80 | 390 | 175 | 100 | 70 |
| −60 | 405 | 287 | 100 | 100 |
| −30 | 400 | 298 | 100 | 100 |
| −10 | 403 | 297 | 100 | 100 |

The results thus obtained show that pipes made of steel according to the present invention present no brittle fracture even at −80° C. for the as-quenched and tempered conditions.

In addition, even after a severe uniaxial deformation of 5% followed by ageing at 250° C. for 1 h, this good ductile behavior is kept for temperatures down to −60° C.

7.3. Crack Tip Opening Displacement (CTOD)

Three specimen were cut on each pipes (A4) and (A4-5%), and respectively (A5). The tests and results evaluations followed the standard BS 7448-1. The tested pipes had a wall thickness of 25.4 mm.

The CTOD values are given in the table 8 here below.

TABLE 8

| | | CTOD | | |
|---|---|---|---|---|
| | | CTOD values (mm) | | |
| Steel | T (° C.) | notch 1 | notch 2 | notch 3 | mean |
| A4 | −20° C. | 1.35 | 1.36 | 1.34 | 1.35 |
| A4 | −60° C. | 1.23 | 1.20 | 1.27 | 1.23 |
| A5 | −60° C. | 1.31 | 1.38 | 1.32 | 1.33 |

TABLE 8-continued

| | | CTOD | | | |
|---|---|---|---|---|---|
| | | CTOD values (mm) | | | |
| Steel | T (° C.) | notch 1 | notch 2 | notch 3 | mean |
| A5 | −60° C. | 1.24 | 1.18 | 1.21 | 1.21 |
| A4-5% | −20° C. | 1.22 | 1.18 | 1.15 | 1.18 |
| A4-5% | −60° C. | 1.02 | 1.08 | 1.11 | 1.07 |

The results thus obtained show that the CTOD values of the steel according to the present invention are much higher than 0.150 mm as established by DNVGL-ST-F01 specification. Indeed, even at −60° C., the CTOD values are higher than 1 mm.

In addition, all the pipes (A1a), (A1b-2%) and (A1b-5%) present a ductile fracture mode.

Both impact energy and CTOD tests show that the steel of the present invention present an excellent resistance to stress. Even after deformation and ageing, the pipes remain tough for temperatures down to −60° C.

7.4. SSC Resistance

After 720 hours, none of the pipes (A4) and (A4-5%) presents a failure nor secondary cracks. All the pipes show an excellent sulphide stress cracking resistance, even after straining and ageing, and can therefore be used in severe sour conditions.

The invention claimed is:

1. A steel having a yield strength of at least 485 MPa and having a chemical composition consisting of, in weight %, relative to the total weight of the chemical composition,
0.05≤C≤0.10,
0.15≤Si≤0.35,
1.20≤Mn≤1.50,
0.02≤Cr≤0.08,
0.10<Mo≤0.30,
0.015≤Al≤0.040,
0.002≤N≤0.012,
0.10≤Ni≤0.30,
0.03≤V≤0.04,
0.02≤Nb≤0.028, and
0.001≤Ti≤0.025,
wherein
a content of V+Nb is 0.07 wt % or less,
the balance of the chemical composition of the steel is constituted by Fe and at least one residual element selected from the group consisting of P, S, B, Ca, Cu and a mixture thereof,
the chemical composition of the steel satisfies the following formula wherein contents of C, Cr, Mo, Nb, V and Ti are expressed in weight %;
C+Cr+Mo+Nb+V+Ti≤0.55,
wherein the steel has an absorbed energy of from 390 J to 405 J at a temperature of from −80° C. to −10° C., and
wherein the chemical composition satisfies the following formula, wherein the contents of Cr and Mo are expressed in weight %, Cr+Mo≤0.35.

2. The steel according to claim 1, wherein the steel has a yield strength of from 495 and to 675 MPa.

3. The steel according to claim 1, wherein the steel has a yield strength of from 555 MPa and to less than 675 MPa.

4. The steel according to claim 1, wherein the content of C in the chemical composition in weight %, relative to the total weight of said chemical composition, is 0.06≤C≤0.08.

5. The steel according to claim 1, wherein the content of Si in the chemical composition in weight %, relative to the total weight of said chemical composition, is 0.23≤Si≤0.31.

6. The steel according to claim 1, wherein the content of Mn in the chemical composition in weight %, relative to the total weight of said chemical composition, is 1.35≤Mn≤1.45.

7. The steel according to claim 1, wherein the content of Cr in the chemical composition in weight %, relative to the total weight of said chemical composition, is 0.06≤Cr≤0.08.

8. The steel according to claim 1, wherein the content of Mo in the chemical composition in weight %, relative to the total weight of said chemical composition, is 0.16≤Mo≤0.26.

9. The steel according to claim 1, wherein the content of Ti in the chemical composition in weight %, relative to the total weight of said chemical composition, is 0.005≤Ti≤0.020.

10. The steel according to claim 1, wherein amounts of the residual elements, expressed in weight %, relative to the total weight of the chemical composition, are as follows:
P≤0.012,
S≤0.003,
B≤0.0005,
Ca≤0.004, and
Cu≤0.12.

11. A seamless pipe, made from the steel of claim 1.

12. The seamless pipe according to claim 11, wherein steel yield strength is from 555 MPa to 740 MPa, a pipe wall thickness is from 15.1 mm to 35 mm, and the content of Mo in the steel chemical composition in weight %, relative to the total weight of said chemical composition, is 0.16≤Mo≤0.26.

13. The seamless pipe according to claim 11, wherein steel yield strength is from 485 MPa to 635 MPa, a pipe wall thickness is from 9.3 to 40 mm, and the content of Mo in the steel chemical composition in weight %, relative to the total weight of said chemical composition, is 0.10≤Mo≤0.21.

14. A process for manufacturing a seamless pipe, the process comprising:
hot forming the steel of claim 1 to form a seamless pipe, and cooling down the seamless pipe to room temperature,
heating up the cooled seamless pipe to an austenitization temperature of from 890 to 970° C. to obtain an austenitized seamless pipe, and then quenching the austenitized seamless pipe down to ambient temperature, thereby obtaining a quenched seamless pipe,
heating the quenched seamless pipe to a tempering temperature of from 610 to 680° C. and keeping the seamless pipe at the tempering temperature for a time and then cooling the seamless pipe down to ambient temperature to obtain a quenched and tempered seamless pipe.

15. The process according to claim 14, wherein the tempering temperature is from 630 to 665° C.

16. A method, comprising installing the seamless pipe of claim 11 as a process pipe, a flowline, or a riser in an oil and gas industry application.

* * * * *

UNITED STATES PATENT AND TRADEMARK OFFICE
CERTIFICATE OF CORRECTION

| | |
|---|---|
| PATENT NO. | : 12,276,014 B2 |
| APPLICATION NO. | : 16/572918 |
| DATED | : April 15, 2025 |
| INVENTOR(S) | : Da Trindade Filho et al. |

It is certified that error appears in the above-identified patent and that said Letters Patent is hereby corrected as shown below:

In the Drawings

On Sheet 1 of 6, FIG. 1a, delete "25,4 mm" and insert -- 25.4 mm --, therefor at each occurrence throughout the Figures 1a, 2a & 3.

In the Specification

In Column 3, Line 10, delete "weight %." and insert -- weight %, --, therefor.

In Column 12, Line 11, delete "for for" and insert -- for --, therefor.

In Column 17, Line 37, delete "according the" and insert -- according to the --, therefor.

In Column 19, Line 13, delete "DNVGL-ST-F01" and insert -- DNVGL-ST-F101 --, therefor.

In the Claims

In Column 19, Claim 1, Line 52, delete "weight %;" and insert -- weight %: --, therefor.

Signed and Sealed this
Eleventh Day of November, 2025

John A. Squires
*Director of the United States Patent and Trademark Office*